(12) United States Patent
Thom et al.

(10) Patent No.: US 9,956,918 B2
(45) Date of Patent: May 1, 2018

(54) STABILIZING CARGO ORGANIZER

(71) Applicant: MacNeil IP LLC, Bolingbrook, IL (US)

(72) Inventors: Allan R. Thom, Burr Ridge, IL (US); David S. Iverson, Oak Brook, IL (US); David F. MacNeil, Fort Lauderdale, FL (US); Frederick W. Masanek, Jr., Barrington, IL (US)

(73) Assignee: MacNeil IP LLC, Bolingbrook, IL (US)

( * ) Notice: Subject to any disclaimer, the term of this patent is extended or adjusted under 35 U.S.C. 154(b) by 0 days. days.

(21) Appl. No.: 15/032,291

(22) PCT Filed: Jun. 27, 2014

(86) PCT No.: PCT/US2014/044524
§ 371 (c)(1),
(2) Date: Apr. 26, 2016

(87) PCT Pub. No.: WO2015/065540
PCT Pub. Date: May 7, 2015

(65) Prior Publication Data
US 2016/0250977 A1    Sep. 1, 2016

Related U.S. Application Data

(63) Continuation of application No. 14/068,782, filed on Oct. 31, 2013, now Pat. No. 9,248,783.

(51) Int. Cl.
*B60R 7/02* (2006.01)
(52) U.S. Cl.
CPC .................................. *B60R 7/02* (2013.01)

(58) Field of Classification Search
CPC .. B60R 7/02; B60R 7/14; B60R 11/00; B60R 2011/003; B60P 7/0892
USPC ....................................................... 224/542
See application file for complete search history.

(56) References Cited

U.S. PATENT DOCUMENTS

| | | |
|---|---|---|
| 4,027,892 A | 6/1977 | Parks |
| 4,512,503 A | 4/1985 | Gioso |
| 4,718,584 A | 1/1988 | Schoeny |
| 4,733,898 A | 3/1988 | Williams |
| 4,824,158 A | 4/1989 | Peters et al. |
| 4,838,745 A | 6/1989 | Haydock |
| 4,842,460 A | 6/1989 | Schlesch |
| 4,884,733 A | 12/1989 | Geeves |
| 4,941,784 A | 7/1990 | Flament |
| 5,031,769 A | 7/1991 | Shea et al. |
| 5,161,700 A | 11/1992 | Stannis et al. |
| 5,167,433 A | 12/1992 | Ryan |
| 5,205,602 A | 4/1993 | Hoare et al. |
| 5,392,972 A | 2/1995 | Caruso et al. |

(Continued)

OTHER PUBLICATIONS

USPTO as International Searching Authority, The International Search Report and the Written Opinion of the International Searching Authority, issued in connection with Patent Application No. PCT/US14/44524 dated Oct. 24, 2014.

*Primary Examiner* — Peter Helvey
(74) *Attorney, Agent, or Firm* — Perkins IP Law Group LLC; Jefferson Perkins

(57) ABSTRACT

Cargo organizers may be used for various sized boxes and packages. A friction pad overmolded on a bottom panel of the organizer body prevents movement when the cargo is transported in a vehicle.

17 Claims, 11 Drawing Sheets

(56) References Cited

U.S. PATENT DOCUMENTS

| | | | |
|---|---|---|---|
| 5,469,999 | A | 11/1995 | Phirippidis |
| 5,518,170 | A | 5/1996 | Rasmussen |
| 5,549,428 | A | 8/1996 | Yeatts |
| 5,601,271 | A | 2/1997 | Janowski et al. |
| 5,603,439 | A | 2/1997 | Pineda |
| 5,605,108 | A | 2/1997 | Woosley |
| 5,655,863 | A | 8/1997 | Mundt |
| 5,662,305 | A | 9/1997 | Shimamura et al. |
| 5,819,996 | A | 10/1998 | Koons, Jr. |
| 5,865,580 | A | 2/1999 | Lawrence |
| 5,975,819 | A | 11/1999 | Cola |
| 6,012,885 | A | 1/2000 | Taylor et al. |
| 6,109,847 | A | 8/2000 | Patel et al. |
| 6,244,802 | B1 | 6/2001 | Stanesic et al. |
| 6,564,397 | B1 | 5/2003 | Hawley et al. |
| 6,623,840 | B2 | 9/2003 | Hainbach |
| 6,702,532 | B1 | 3/2004 | Throener |
| 7,090,275 | B2 | 8/2006 | Pero |
| 7,306,416 | B1 | 12/2007 | Arico |
| 7,419,203 | B2 | 9/2008 | Chandler et al. |
| 7,636,960 | B2 | 12/2009 | Hawley et al. |
| 7,959,390 | B2 | 6/2011 | Gorski |
| 8,210,591 | B2 | 7/2012 | Martin |
| 9,067,521 | B1 * | 6/2015 | Masanek, Jr. ............ B60R 11/00 |
| 9,168,874 | B2 | 10/2015 | Smith et al. |
| 2013/0095295 | A1 | 4/2013 | Masanek, Jr. et al. |

* cited by examiner

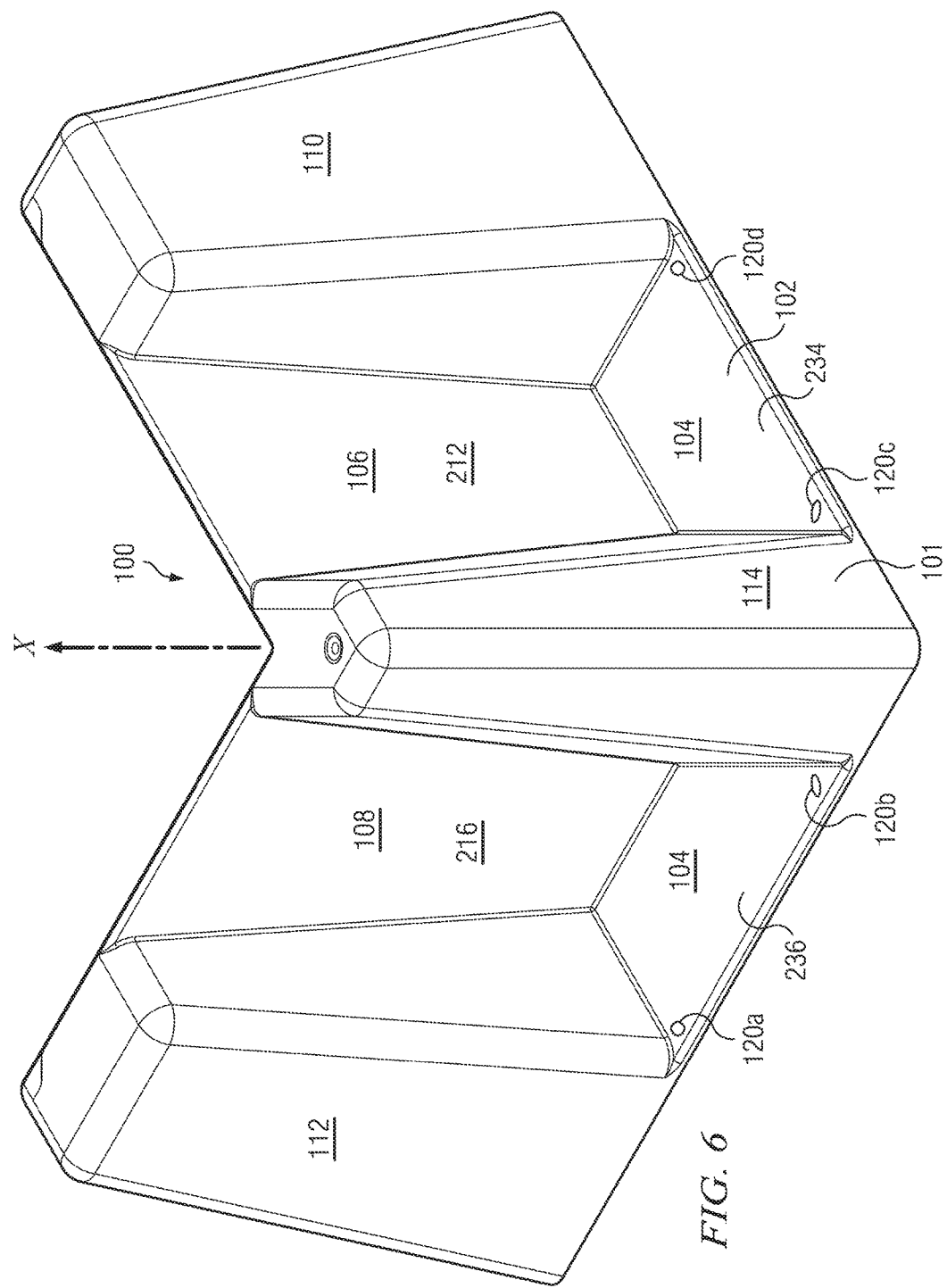

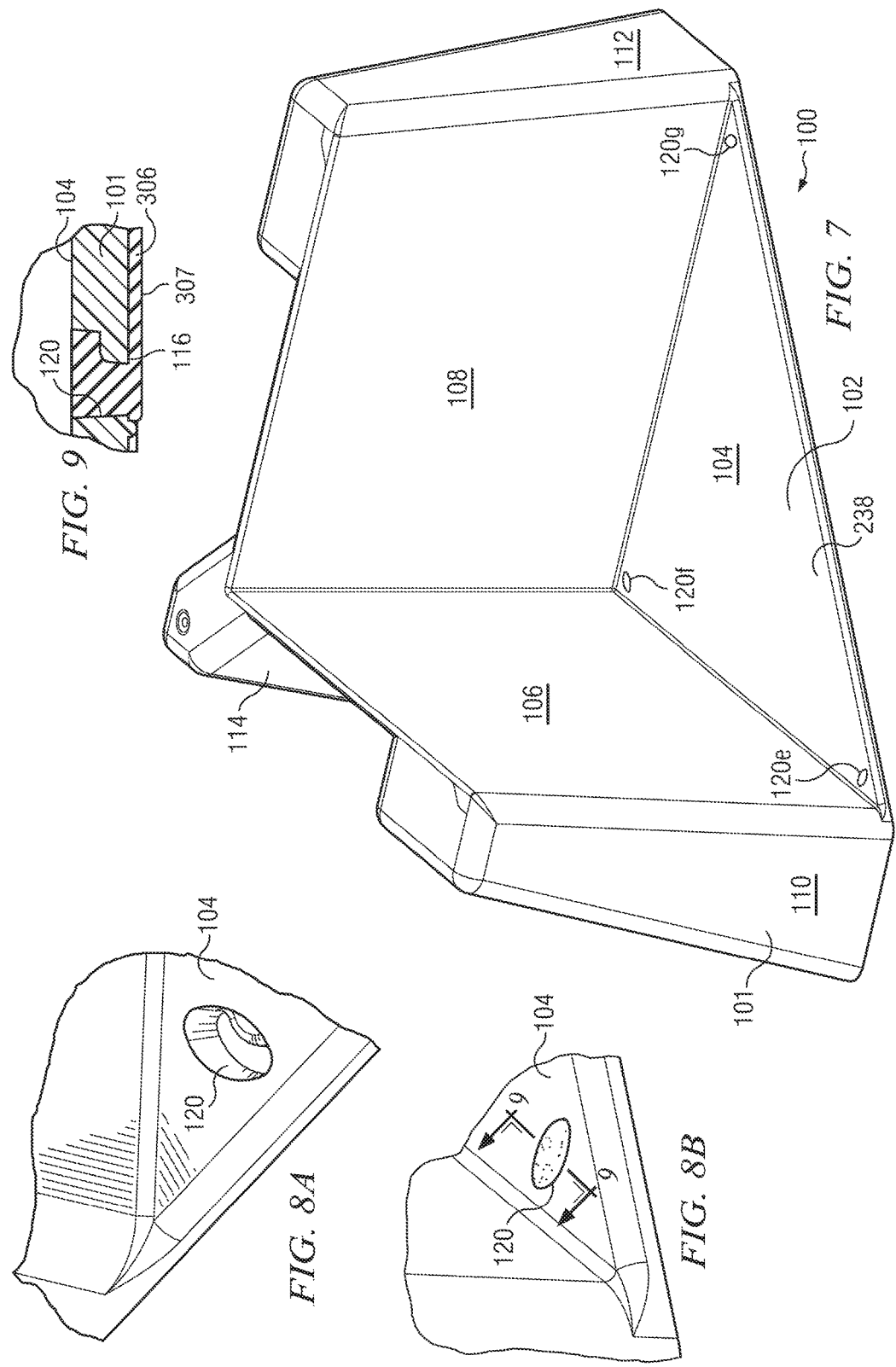

STABILIZING CARGO ORGANIZER

BACKGROUND OF THE INVENTION

Vehicles have limited space in which to carry cargo. Most often cargo is situated in trunks, truck beds, and cargo areas. The limited space and the need to optimize the use of that space while transporting multiple items efficiently and safely leads many users to purchase and install various cargo organizers. However, although cargo organizers may inhibit or prevent the cargo from shifting while in transit, most cargo organizers are only partially adjustable allowing the user to have the limited capability of adjusting dividers and pockets rather than the ability to adjust the organizer to fit the varying sizes of the packages or cargo. Cargo organizers on the market cannot be tailored to fit all shapes and sizes of potential cargo—they especially cannot accommodate medium to large cargo or boxes so those items would shift and slide in the vehicle. Furthermore, cargo organizers take up valuable cargo space when not being used.

Thus a need exists for an adjustable cargo stabilizer that can be used to keep large items such as boxes and top heavy items such as packed grocery bags, secure in cargo beds, cargo spaces, or trunks without taking up a lot of space when not in use.

SUMMARY OF THE INVENTION

According to one aspect of the invention, a cargo organizer has an organizer body which is molded from a first polymer. The organizer body has a bottom panel which has an upper surface and lower surface and is disposed substantially at right angles to a vertical axis. Several spaced-apart holes extend from the lower surface of the bottom panel to the upper surface of the bottom panel. A first wall is integrally molded with the bottom panel and extends upwardly in parallel to the vertical axis. A friction pad formed of a second polymer is overmolded on the lower surface of the bottom panel. The friction pad extends through the holes on the bottom panel to provide a mechanical lock between the friction pad and the organizer body.

According to another aspect of the invention, a cargo organizer has two walls with the first and second walls disposed at an angle to each other.

According to another aspect of the invention, a cargo organizer has an organizer body molded to form a first polymer compound, and has a bottom panel with an upper and lower surface. The bottom panel is disposed at substantially a right angle to a vertical axis. An upstanding first wall is molded with the bottom panel and upwardly extends in parallel to the vertical axis. A first pier is integrally molded with and at least partially defines the first wall. The open bottom of the first pier is substantially coplanar with the bottom panel. A friction pad of a second polymer is overmolded on the bottom panel.

An upstanding second wall is molded with the bottom panel and upwardly extends in parallel to the vertical axis and at an angle to the first wall. A second pier which is spaced from the first pier is integrally molded with and at least partially defines the second wall.

According to another aspect of the invention, a second pier is spaced from the first pier and upwardly extends from the bottom panel. The second pier forms a portion of the first wall.

According to another aspect of the invention, a hollow third pier is spaced from the first and second piers. The third pier may form a portion of the first wall or may form a portion of the first and second walls.

According to yet another aspect of the invention, a cargo organizer has an organizer body molded from a first polymer. A bottom panel of the organizer body has a surface area. At least one hollow pier adjoins the bottom panel. The organizer body has a footprint which is equal to the surface area of the bottom panel and the area of the hollow bottom of the pier. A friction pad of a second polymer is overmolded on the bottom panel, but does not extend to cover the hollow bottom of the pier.

According to another aspect of the invention, a second pier is integrally molded with and partially defines the first wall. The open bottom of the second pier is substantially coplanar with the bottom panel. The second pier is spaced from the first pier and the friction pad does not extend to cover the open bottom of the second pier.

According to another aspect of the invention, a third pier is integrally molded with and partially defines a first wall. The open bottom of the third pier is substantially coplanar with the bottom panel. The third pier is spaced from the first and second piers and the friction pad does not extend to cover the open bottom of the third pier.

In yet another aspect of the invention, the third pier may form a portion of the first and second walls.

The present invention provides an advantage over prior cargo organizers because it prevents many different sizes of cargo from shifting. In addition and when not in use, the cargo organizer can be stored and take up minimal space. Furthermore, the friction pad of the cargo organizer is strongly adhesively bonded to and mechanically locked to the bottom panel, and for these reasons will not delaminate.

BRIEF DESCRIPTION OF THE DRAWINGS

Further aspects of the invention and their advantages can be discerned in the following detailed description, in which like characters denote like parts and in which:

FIG. 6 is an outer isometric view of a corner of the stabilizing cargo organizer;

FIG. 7 is an isometric view looking into a corner formed by the stabilizing cargo organizer;

FIG. 8A is a detail view, from the top, of a representative through hole of the stabilizing cargo organizer before overmolding;

FIG. 8B is a detail view, from the top, of a representative through hole of the stabilizing cargo organizer after overmolding;

FIG. 9 is a sectional view corresponding to a section along line 9-9 of FIG. 8B;

DETAILED DESCRIPTION

Figure 1:
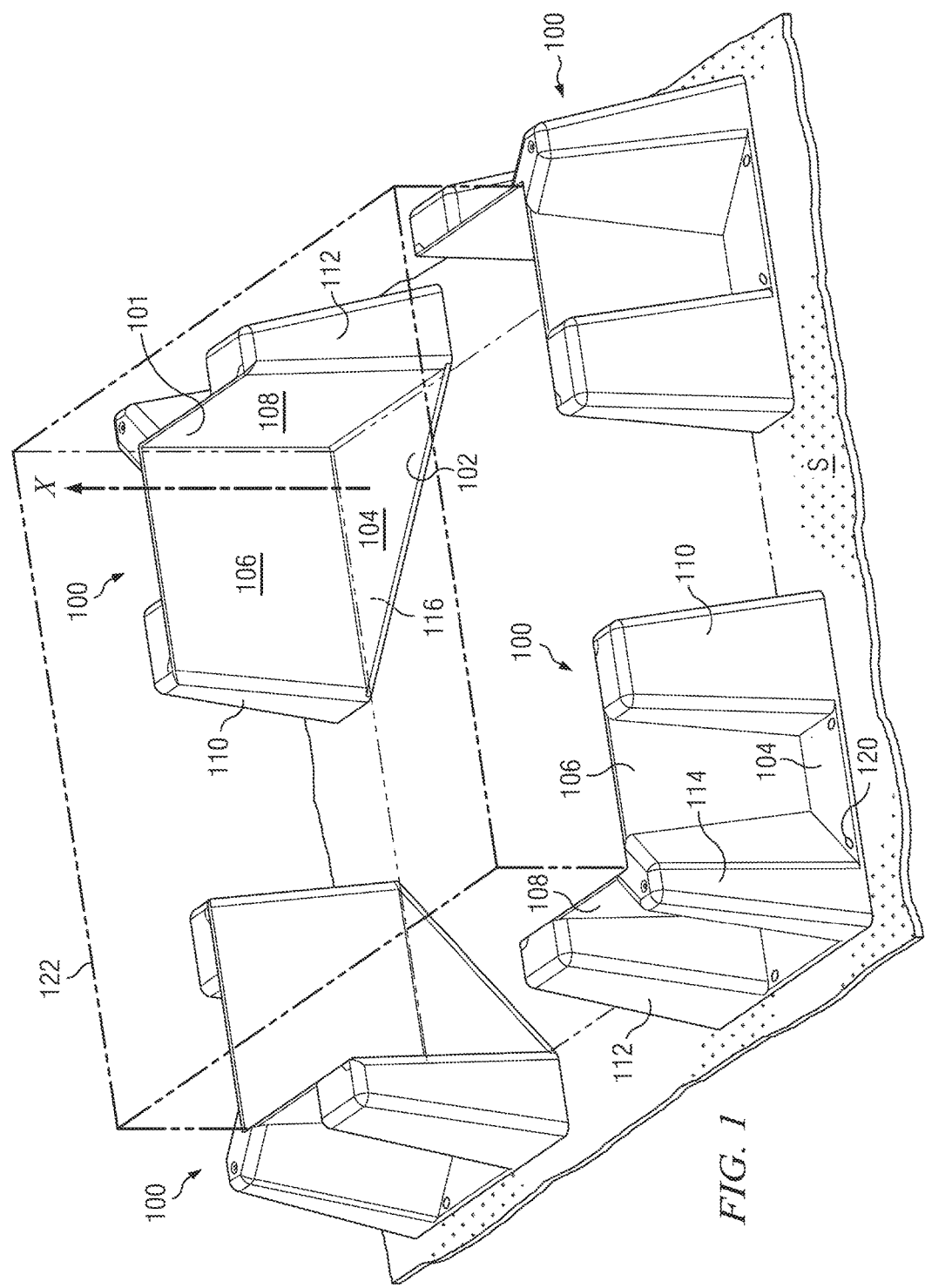
FIG. 1 is an isometric view of four stabilizing cargo organizers according to the invention, as assembled around a box that is shown as environmental structure.

Stabilizing cargo organizers 100 according to the invention can be used to stabilize and organize cargo such as boxes on a surface S which may be a surface in a cargo bed, a cargo space or a trunk of a vehicles. In the exemplary embodiment shown in FIG. 1, four stabilizing cargo organizers 100 are positioned around a box 122. A friction pad 306 (See FIGS. 3 and 5) disposed on the bottom of each cargo organizer 100 prevents movement of the cargo organizers 100 and caged cargo. The heavier the object placed on the cargo organizer 100, the more force will be required to move the cargo organizer 100. The force required to move the cargo organizer 100 is proportional to the weight of the box 122 or cargo times the area of the friction pad 306 times the coefficient of friction of the friction pad 306.

Referring to FIGS. 2-4 and 6, a body 101 of the organizer 100 is molded from a first polymer compound, preferably a rigid polypropylene, but alternatively could be formed from polystyrene, polyethylene, polycarbonate or acrylic. The organizer 100 has a bottom panel 102 with an upper surface 104 and a lower surface 116 and is disposed substantially at a right angle to a vertical axis X. Several through holes 120 extend from the upper surface 104 to the lower surface 116. A first wall 106 is integrally molded with the bottom panel 102 and upwardly extends in parallel to the vertical axis X. A second wall 108 is integrally molded with the bottom panel 102 and upwardly extends in parallel to the vertical axis X. The first and second walls 106, 108 are disposed at a right angle to each other in the illustrated embodiment. Accordingly, the intersection of the first wall 106, the second wall 108 and the bottom panel 102 forms a corner and a ledge for the box 122 (shown in phantom) to be placed upon. In the illustrated embodiment, each corner of the box 122 is placed on the upper surface 104 of the bottom panel 102 of one of the four organizers 100. In other embodiments, the first and second walls 106, 108 may be disposed relative to each other at an angle other than ninety degrees. In yet further embodiments the first and second walls 106, 108 may not intersect.

Figure 2:
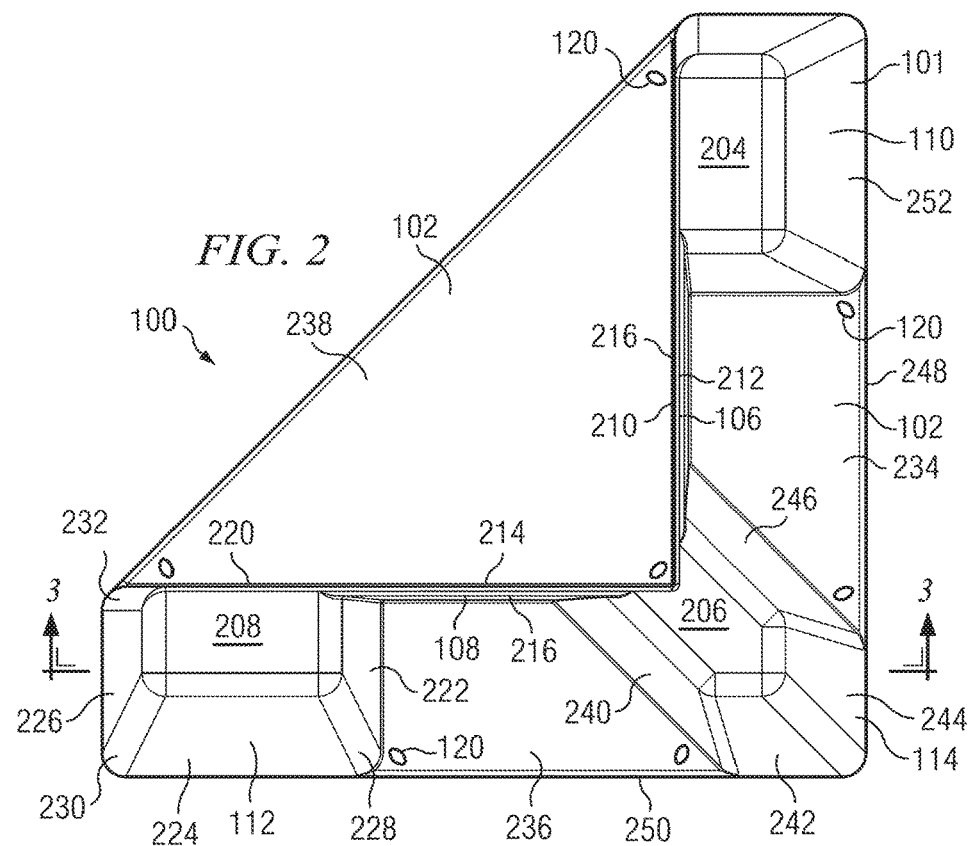
FIG. 2 is a plan view of a stabilizing cargo organizer shown in FIG. 1.

The cargo organizer 100 has a first hollow pier 110 which upwardly extends from the bottom panel 102 and is integrally molded with and at least partially defines the first wall 106. A second hollow pier 112, which is spaced apart from the first pier 110, upwardly extends from the bottom panel 102 and is integrally molded with and at least partially defines the second wall 108. As shown in FIG. 2, the first and second piers 110, 112 have similar shapes which is substantially a four-sided frustopyramidal shape. For example, in FIG. 2, the second pier 112 has four walls 220, 222, 224, and 226 and three rounded corners 228, 230, 232. An interior wall 220 at least partially defines the second wall 108. The remaining walls 222, 224, 226 angle inward as the second pier 112 extends from the bottom panel 102 to a top pier panel 208 such that the surface area of the top pier panel 208 is smaller than the surface area of the open pier bottom 302 (See FIG. 3).

The embodiment illustrated in FIG. 2 has a third pier 114, which is spaced apart from both the first and second piers 110, 112. The third pier 114 upwardly extends from the bottom panel 102. The third pier 114 forms a junction between the first and second walls 106, 108; in this illustrated embodiment the junction is ninety degrees. The two interior walls of the third pier 114 are integrally formed with and at least partially define the first and second walls 106, 108. The remaining walls 240, 242, 244, 246 angle inward as the wall extends from the bottom panel 102 to a top pier panel 206. While the illustrated embodiment has a first pier 110, second pier 112 and third pier 114, other embodiments may have no piers or one or two piers. In addition, piers 110, 112, 114 may have shapes other than the shape illustrated. For example, potential shapes for piers 110, 112, 114 may include pyramidal, conical, frustoconical, cylindrical or rectangular prism shapes.

As shown in FIG. 2, the first wall 106 has an interior side 210 and an exterior side 212 opposed to the interior side. Likewise the second wall 108 has an interior side 214 and an exterior side 216 opposed to the interior side 214. In the illustrated embodiment, the bottom panel 102 extends laterally beyond both the interior 210, 214 and exterior 212, 216 sides of the first and second walls 106, 108. In some embodiments the bottom panel may laterally extend beyond both the interior 210, 214 and exterior 212, 216 of only one of the first or second walls 106, 108. In still other embodiments, outer margin segments 248, 250 of the bottom panel 102 may be continuous with either the lower end of the outer wall 252 of the first pier 110, the lower end of the outer wall 224 of the second pier 112, or both.

Figure 3:
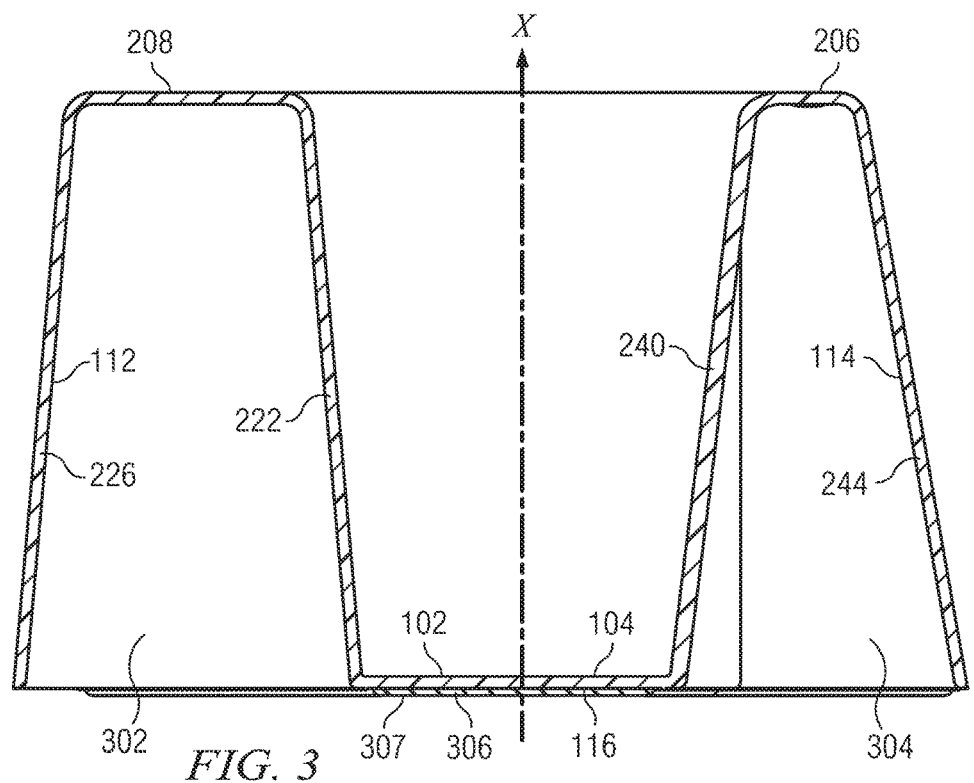
FIG. 3 is sectional view taken substantially along line 3-3 of FIG. 2.

FIG. 3 shows a cross section of the organizer 100 where the hollow third pier 114 and hollow second pier 112 are visible. A hollow bottom 304 of the third pier 114 and a hollow bottom 302 of the second pier 112 are coplanar with the lower surface 116 of the bottom panel 102. The first pier 110 has a hollow bottom that is also coplanar with the lower surface 116 of the bottom panel 102. A friction pad 306 formed of a second polymer compound which, as molded, has a higher coefficient of friction, relative to surface S, than the first polymer compound, is overmolded on the lower surface 116 of the bottom panel 102 but is not overmolded over the hollow bottoms of the first, second, or third piers 110, 112, 114. As noted above, when a heavy object is placed on the cargo organizer 100, the area of the friction pad 306 and the coefficient of friction of the friction pad 306 combined with the weight of the cargo, make the cargo organizer 100 more resistant to movement. The heavier the object placed on the cargo organizer 100, the greater the resistance to movement. The friction pad 306 is molded to extend into the through holes 120 (FIGS. 2 and 6) and is preferably formed of a thermoplastic elastomer (TPE) but may also be formed from any material which has a high coefficient of friction relative to surface S. The material of friction pad 306 preferably is selected to grip a surface S made out of a TPE or a rubber, such as the upper surface of a cargo liner.

Figure 4:
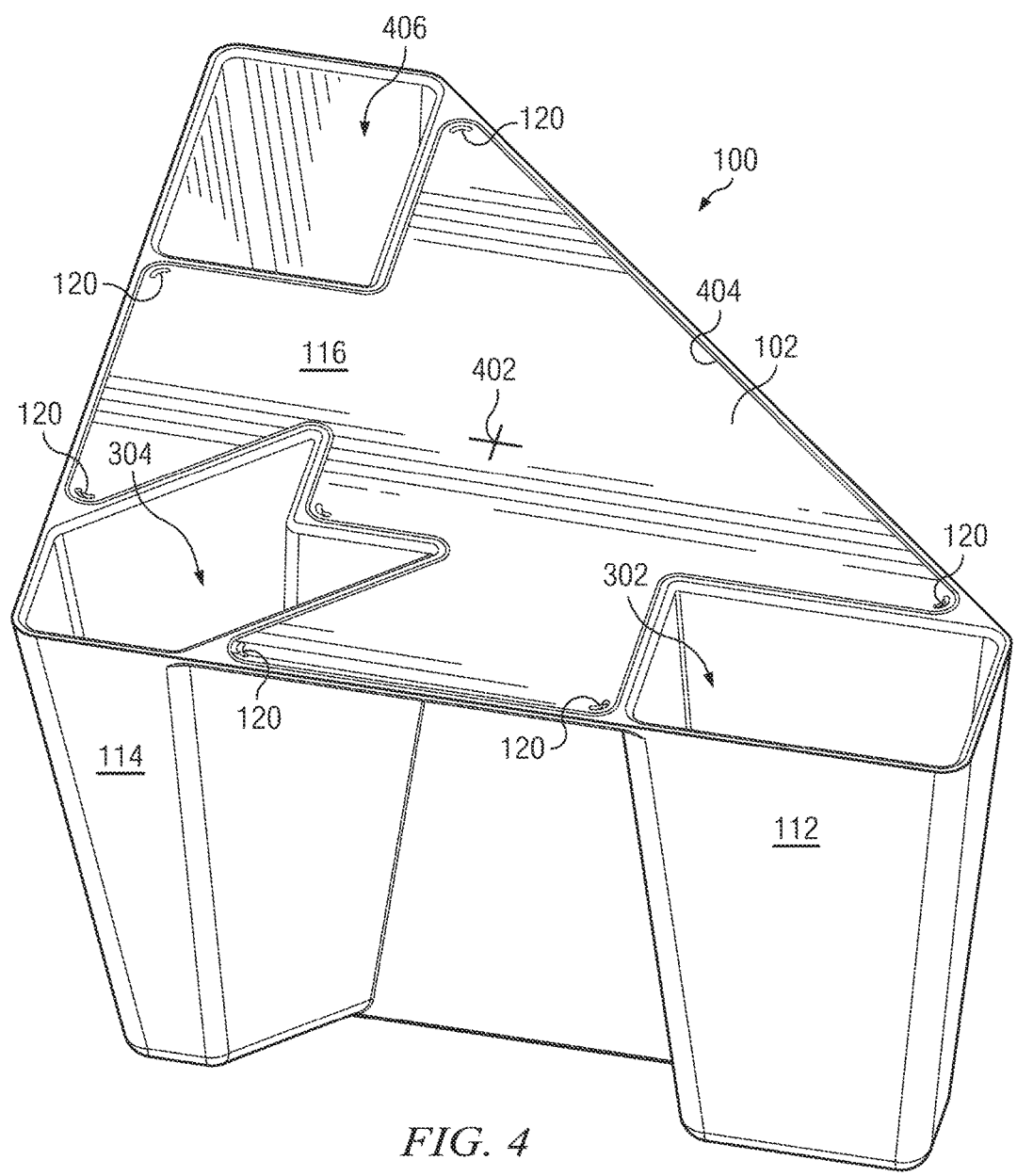
FIG. 4 is an isometric view of the bottom of the stabilizing cargo organizer shown in FIG. 1, illustrating the cargo organizer prior to overmolding with a second polymer compound.

FIG. 4 shows the lower surface 116 of the bottom panel 102 before the friction pad 306 is overmolded. More than one through hole 120 are disposed along the perimeter of the bottom panel 102. The through holes 120 preferably are spaced remotely from a central fill point or gate 402. Since they are close to an end-of-fill limit of the second polymer compound, which will spread outward from fill point or gate location 402 radially to holes 120, the holes 120 permit gas trapped in the overmold process to escape to the upper surface 104 of the bottom panel 102 and dissipate into the air. The shape of the through holes 120 changes from a crescent on the lower surface 116 of the bottom panel 102 (FIG. 4) to an oval on the upper surface 104 of the bottom panel 102 (See FIGS. 1 and 2), expanding in area as one proceeds upwardly. Therefore, in addition to venting gas, the through holes 120 help form a mechanical lock or attachment of the overmolded friction pad 306 to the lower surface 116 of the bottom panel 102.

A crush bead 404 is disposed on the lower surface 116 of the bottom panel 102 near its lateral boundary. The crush bead 404 is a smooth endless horizontal surface that downwardly depends from the lower surface 116 of the bottom panel 102. The crush bead 404 is used as a shut off surface to prevent the flashing of the second polymer compound during a "second shot" or overmolding step of fabrication.

Figure 5:
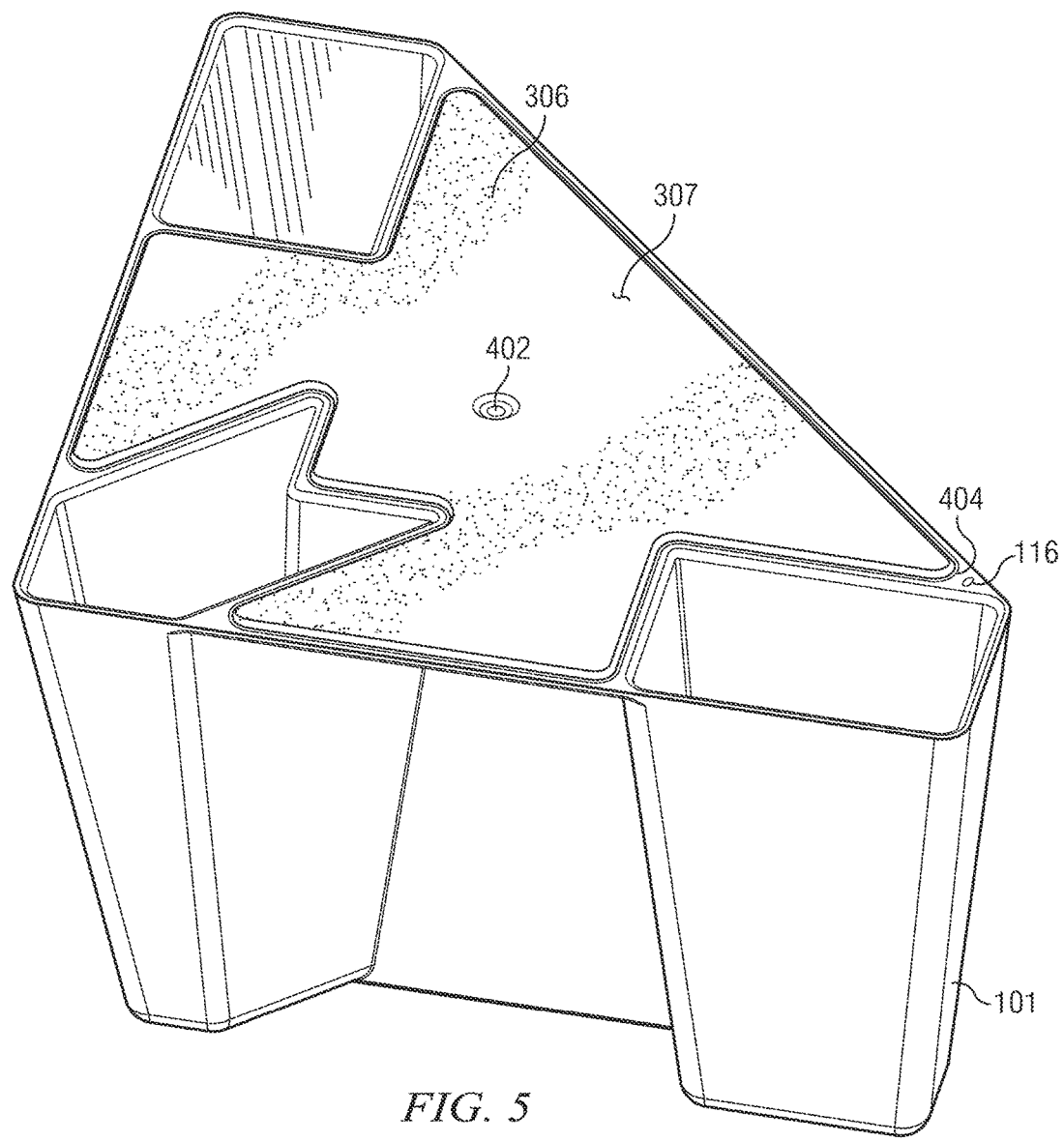
FIG. 5 is an isometric view of the bottom of the same stabilizing cargo organizer shown in FIG. 4, shown after overmolding is complete.

FIG. 5 shows the lower surface 116 of the bottom panel 102 after the overmolding process has occurred. Here, the friction pad 306 has been overmolded onto the lower surface 116 of the bottom panel 102 within the perimeter of the crush bead 404. A lower surface 307 of the pad 306 is slightly lower than and is parallel to the lower surface 116 of the first-shot bottom panel 102.

FIGS. 6 and 7 show different views of the organizer 100 after the friction pad 306 is overmolded onto body 101. The second polymer of the friction pad 306 is visible in the through holes 120a-f with the top of the polymer in the through hole 120 being coplanar with the upper surface 104 of the bottom panel 102. In the illustrated embodiment two through holes, 120c, 120d, are between the first and third piers 110, 114 and the exterior 212 of the first wall 106, on outer trapezoidal shelf 234, near the lateral outer periphery of bottom panel 102. Through hole 120c is near the outer periphery of pier 114 and hole 120d is near the outer periphery of pier 110. There are two through holes 120a, 120b, between the second and third piers 112, 114, and the exterior 216 of the second wall 108 on outer trapezoidal shelf 236, near the lateral outer periphery of bottom panel 102. Through hole 120a is near the outer periphery of pier 112 and hole 120b is near the outer periphery of pier 114. In addition, as shown on FIG. 7, through hole 120e is disposed on the upper surface 104 of the bottom panel 102, on the inner triangular shelf 238 near the outer periphery of panel 102 and wall 106. Through hole 120f is disposed on the upper surface 104 of the bottom panel 102, on the inner triangular shelf 238, near the junction of walls 106 and 108. Through hole 120g is disposed on the upper surface 104 of the bottom panel 102, on the inner triangular shelf 238, near the outer periphery of panel 102 and wall 108. Other embodiments may have more or fewer through holes 120 which may be disposed in different locations.

As shown in FIGS. 4, 8A and 9 and discussed above, the through holes 120 on the lower surface 116 of the bottom panel 102 have a crescent shape. However, the through holes 120 on the upper surface 104 of the bottom panel 102 have an oval shape. FIG. 8A shows the transition of the through hole 120 from oval on the upper surface 104 of the bottom panel 102 to the crescent shape on the lower surface 116 of the bottom panel 102. See also FIG. 4. FIG. 8B shows the through hole 120 filled with the friction pad material 306. FIG. 9 shows that the through holes transition from the crescent on the lower surface 116 of the bottom panel 102 to the oval on the upper surface 104 of the bottom panel 102. The changing shape and expanding area of the through hole 120 as a function of distance from the lower surface allows for an additional mechanical lock of the friction pad 306 to the bottom panel 102. Other embodiments may have through holes with different shapes with the surface area of the through hole 120 on the upper surface 104 of the bottom panel 102 being larger than the surface area of the through hole 120 on the lower surface 116 of the bottom panel 102.

In the exemplary embodiment shown in FIGS. 2, 6-7, the distance between the third pier 114 and the outermost edge of the first pier 110 is approximately eight inches (20 cm). Likewise, the distance between the center of third pier 114 and the outermost edge of the second pier 112 is approximately eight inches (20 cm). The height of the first, second and third piers, 110, 112, 114, is approximately five inches (13 cm). In FIG. 3, the friction pad 306 extends approximately 0.060 inch (1.5 mm) from the lower surface 116 of the bottom panel 102.

Figure 10:
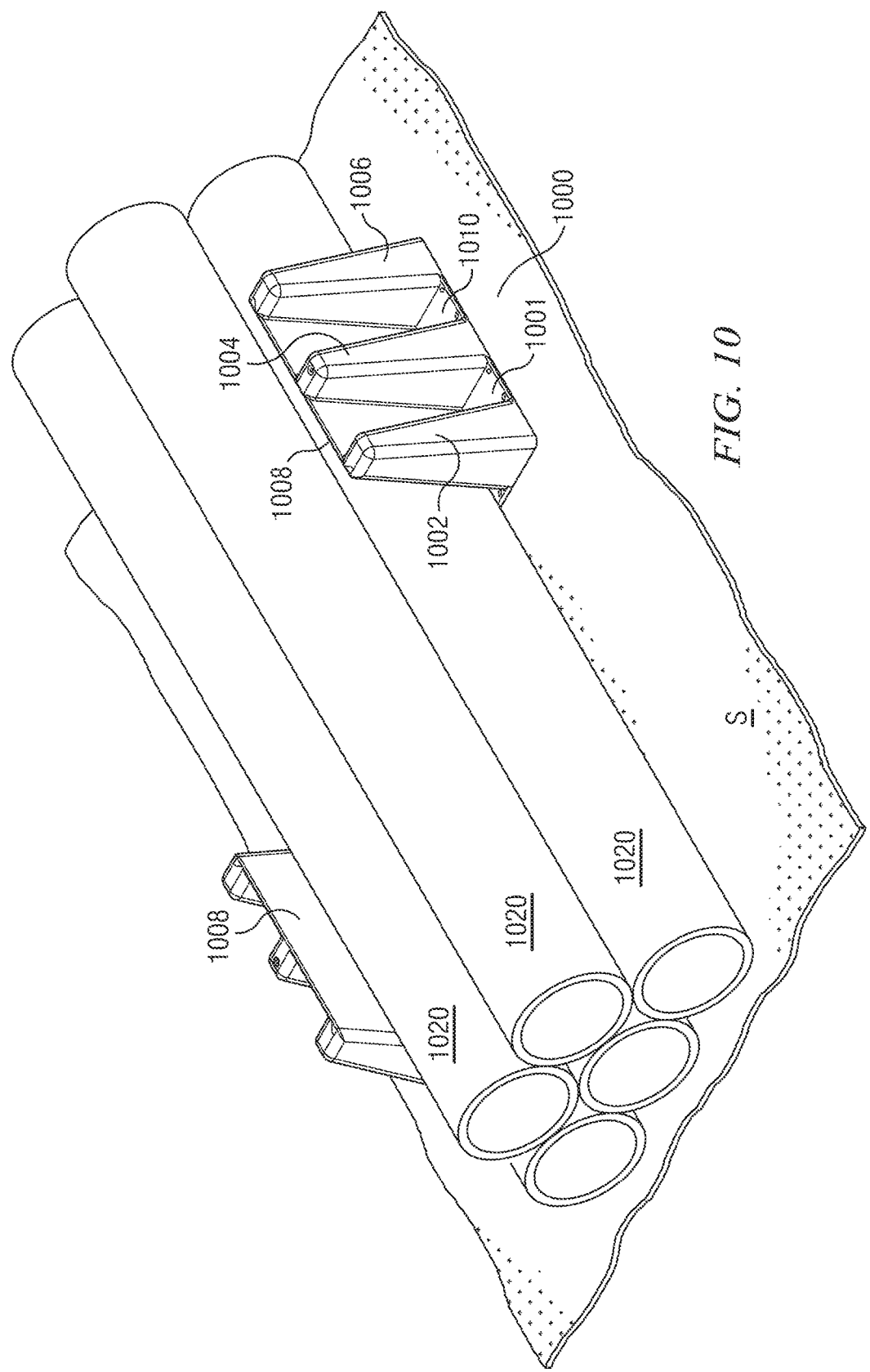
FIG. 10 is an isometric view of a second embodiment of the invention, as assembled around an exemplary group of pipes.

A second embodiment 1000 of the stabilizing cargo organizer according to the invention can be used to stabilize and organize elongate cargo such as pipes on a surface S which may be a surface in a cargo bed, a cargo space or a trunk of a vehicles. In the embodiment shown in FIG. 10, two stabilizing cargo organizers 1000 are positioned around a group of pipes 1020.

Referring to FIGS. 11, 13, 15 and 16, a body 1001 of the second embodiment of the organizer 1000 has a bottom panel 1010 with an upper surface 1134 and a lower surface 1136 and is disposed substantially at a right angle to a vertical axis X. Several through holes 120e-j, 1130a-b extend from the upper surface 1134 to the lower surface 1136. A first wall 1008 is integrally molded with the bottom panel 1010 and upwardly extends in parallel to the vertical axis X. Accordingly, the intersection of the first wall 1008 and the bottom panel 1010 forms a ledge for the pipes 1020 to be placed upon.

Figure 11:
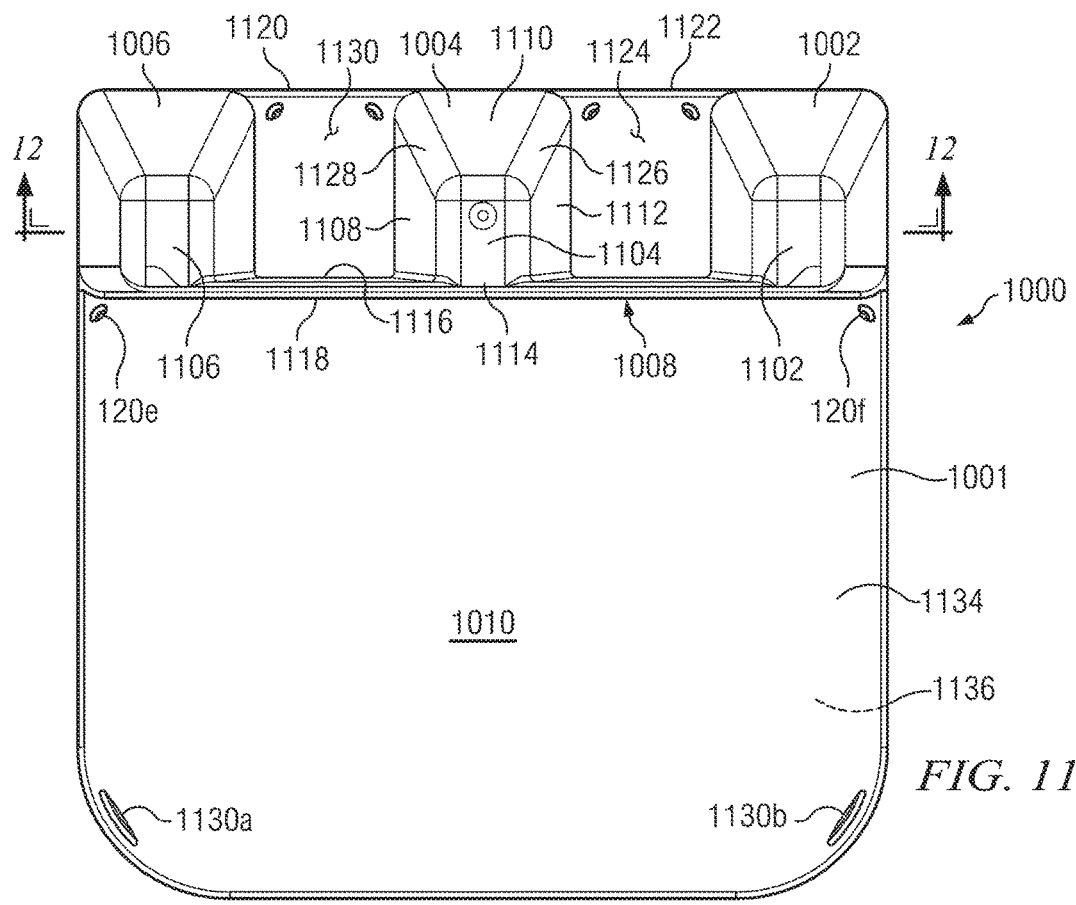
FIG. 11 is a plan view of the embodiment of the invention shown in FIG. 10.

The cargo organizer has a first, a second, and a third hollow pier 1002, 1004, 1006 which upwardly extend from the bottom panel 1010 and are integrally molded with and partially define a vertical wall 1008. As shown in FIG. 11 the first, second, and third piers 1002, 1004, 1006, are spaced apart and have similar shapes which is substantially a four-sided frustopyramidal shape. For example, in FIGS. 11-12, the second pier 1004 has four walls, 1108, 1110, 1112, and 1114, and two rounded corners 1126, 1128. An interior wall 1114 is continuous with and defines vertical wall 1008. The remaining walls 1108, 1110, 1112 angle inward as the second pier 1004 extends from the bottom panel 1010 to a top pier panel 1104 such that the surface area of the top pier panel 1104 is smaller than the surface area of the open pier bottom 1204 (See FIG. 12).

While the illustrated embodiment has a first pier 1002, second pier 1004 and third pier 1006, other embodiments may have no piers or one or two piers. In addition, piers 1002, 1004, 1006 may have shapes other than the shape illustrated. For example, potential shapes for piers 1002, 1004, 1006 may include pyramidal, conical, frustoconical, cylindrical or rectangular prism shapes.

As shown in FIG. 11, the wall 1008 has an interior side 1116 and an exterior side 1118 opposed to the interior side 1116. In the illustrated embodiment, the bottom panel 1010 extends laterally beyond both the interior 1116 and exterior 1118 sides of the first wall 1010. In some embodiments the bottom panel may laterally extend beyond both the interior and exterior sides 1116, 1118 of wall 1008, or only one such side. In an embodiment, an outer margin 1120, 1122 of the bottom panel 1010 may be continuous with the lower ends of all three of the piers 1002, 1004, 1006, as shown, or only two.

Figure 12:
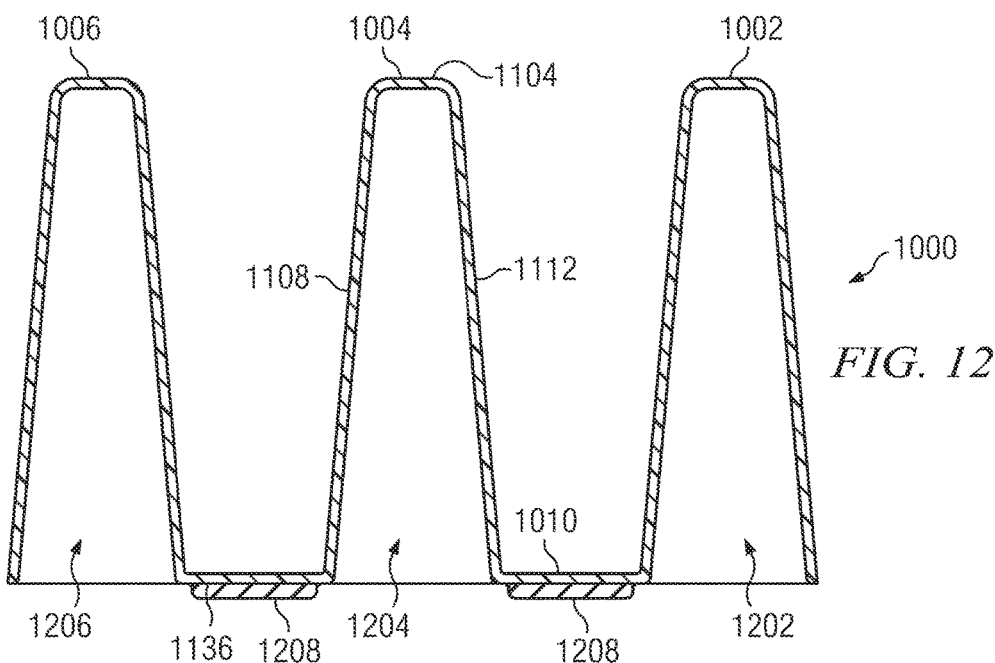
FIG. 12 is a sectional view taken substantially along line 12-12 of FIG. 11.

FIG. 12 shows a cross section of the organizer 1000 where the hollow first, second and third piers 1002, 1004, and 1006 are visible. A hollow bottom 1202 of the first pier 1002, a hollow bottom 1206 of the third pier 1006 and a hollow bottom 1204 of the second pier 1004 are coplanar with the lower surface 1136 of the bottom panel 1010. A friction pad 1208 formed of a second polymer compound which, as molded, has a higher coefficient of friction, relative to surface S, than the first polymer compound, is overmolded on the lower surface 1136 of the bottom panel 1010 but is not overmolded over the hollow bottoms of the first, second, or third piers 1202, 1204, 1206.

Figure 13:
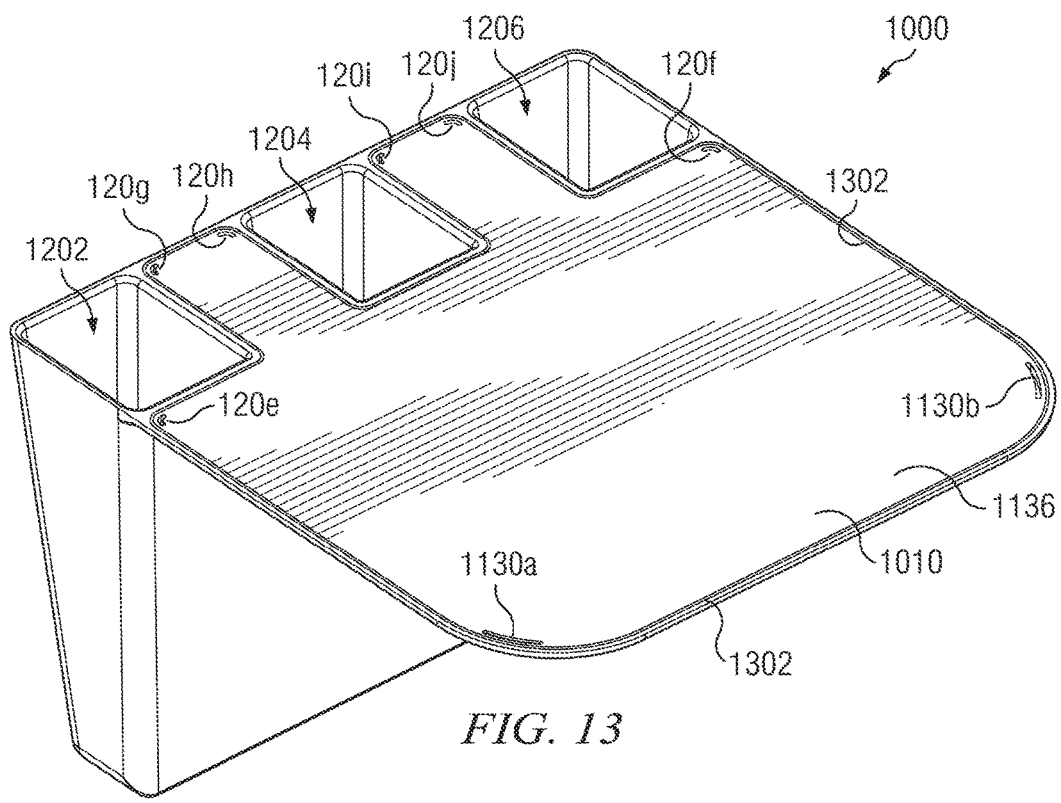
FIG. 13 is an isometric view of the bottom of the stabilizing cargo organizer shown in FIG. 10, illustrating the cargo organizer prior to overmolding with a second polymer compound.
Figure 17A:
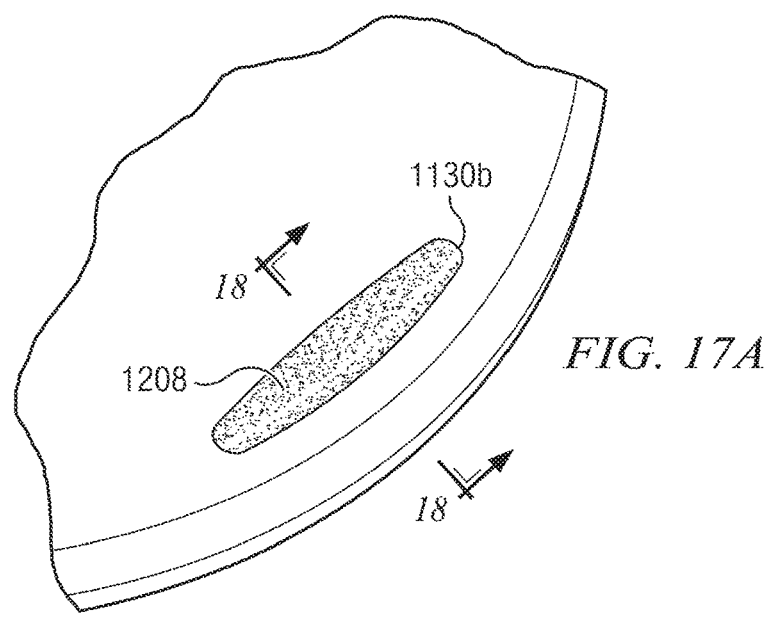
FIG. 17A is a detail view, from the top, of a representative through hole of the stabilizing cargo organizer after overmolding.
Figure 17B:
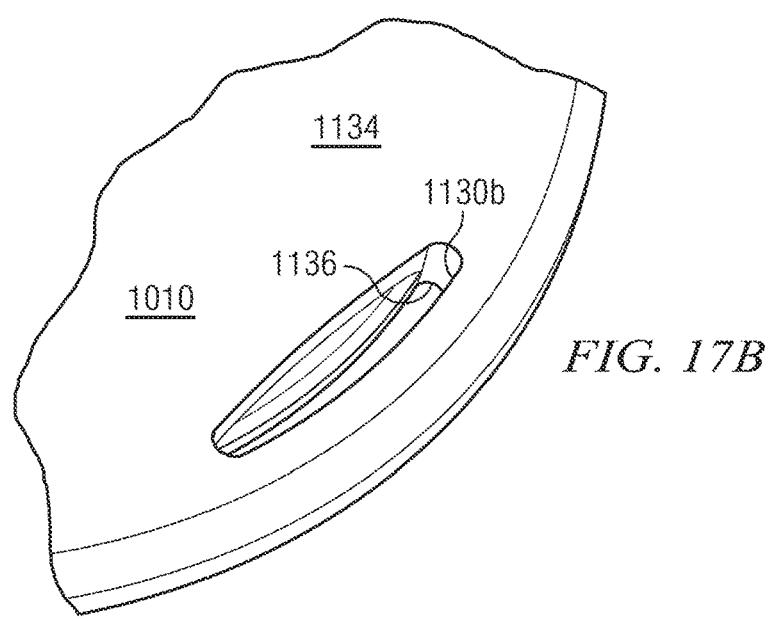
FIG. 17B is a detail view, from the top, of a representative through hole of the stabilizing cargo organizer before overmolding.

FIG. 13 shows the lower surface 1136 of the bottom panel 1010 before the friction pad 1208 is overmolded onto it. More than one through hole 120e-j, 1130a-b are disposed along the perimeter of the bottom panel 1010. The shape of the through holes 120e-j changes from a crescent on the lower surface 1136 of the bottom panel 1010 to an oval on the upper surface 1134 of the bottom panel 1010 in the same manner as the shape of through holes 120a-d (See FIGS. 8A, 8B and 9), expanding in area as one proceeds upwardly, with the through holes 1130a, b furthest from the piers having a more elongated shape. FIGS. 17A and 17B show a representative elongated through-hole 1130b before and after the overmolding of the friction pad 1208. As outlined above, the second polymer compound spreads outward from the gate or fill point location 1404 (See FIG. 14) radially to holes 120e-j, 1130a-b. In addition to venting gas, the through holes 120e-j, 1130a-b help form a mechanical lock or attachment of the overmolded friction pad 1208 to the lower surface 1136 of the bottom panel 1010.

A crush bead 1302 is disposed on the lower surface 1136 of the bottom panel 1010 near its lateral boundary. The crush bead 1302 is a smooth endless horizontal surface that downwardly depends from the lower surface 1136 of the bottom panel 1010. The crush bead 1302 is used as a shut off surface to prevent the flashing of the second polymer compound during a "second shot" or overmolding step of fabrication.

Figure 14:
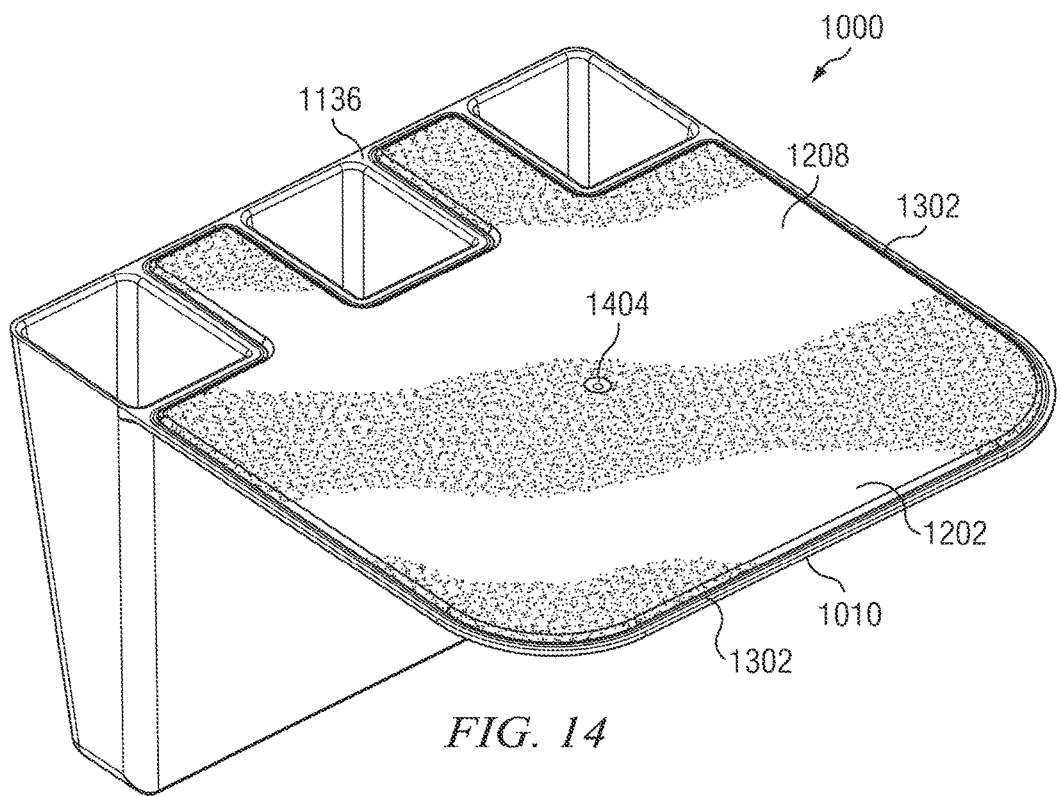
FIG. 14 is an isometric view of the bottom of the same stabilizing cargo organizer shown in FIG. 13, shown after overmolding is complete.

FIG. 14 shows the lower surface 1136 of the bottom panel 1010 after the overmolding process has occurred. Here, the friction pad 1208 has been overmolded onto the lower surface 1136 of the bottom panel 1010 within the perimeter of the crush bead 1302.

Figure 15:
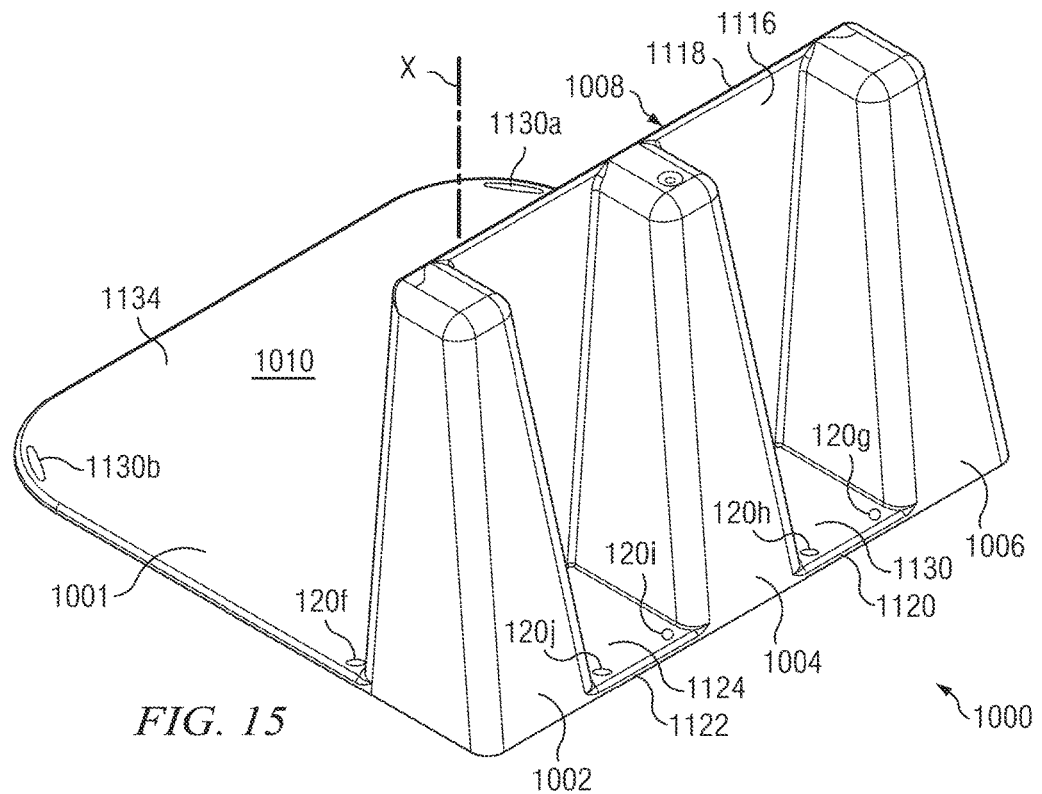
FIG. 15 is an outer isometric view of the stabilizing cargo organizer of FIG. 10.
Figure 16:
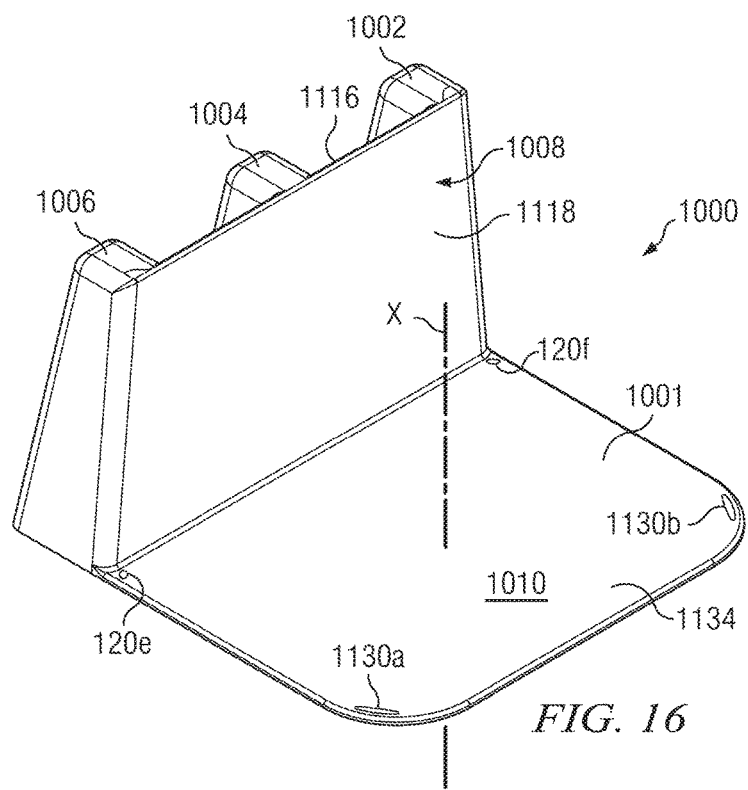
FIG. 16 an isometric view looking onto the top of the stabilizing cargo organizer of FIG. 10.

FIGS. 15 and 16 show different views of the organizer 1000 after the friction pad 1208 (See FIG. 14) is overmolded onto body 1001. The second polymer of the friction pad 1208 is visible in the through holes 120e-j, 1130a-b with the top of the polymer in the through holes 120e-j, 1130a-b being coplanar with the upper surface 1134 of the bottom panel 1010. In the illustrated embodiment two through holes 120j, 120i are between the first pier 1002 and second pier 1004 and the exterior side 1116 of the wall 1008, on outer rectangular shelf 1124 near the lateral outer periphery of bottom panel 1010. Two through holes 120h, 120g are between the second and third piers 1004, 1006 and are to the exterior 1116 of the vertical wall 1008, on outer rectangular shelf 1130 near the lateral outer periphery of bottom panel 1010. In addition, as shown on FIG. 16, through hole 120e is disposed on the upper surface 1134 of the bottom panel 1010, near the outer periphery of panel 1010 and wall 1008. Through holes 120e, f are near the interior side 1118 of wall 1008. Through hole 120f is disposed on the upper surface 1134 of the bottom panel 1010, near the outer periphery of panel 1010 and wall 1008. Through hole 1130a is disposed on the upper surface 1134 of the bottom panel 1010, near the outer periphery of panel 1010. Through hole 1130b is disposed on the upper surface 1134 of the bottom panel 1010, near the outer periphery of panel 1010 in a corner thereof opposite through hole 130a. Other embodiments may have more or fewer through holes 120, 1130 which may be disposed in different locations.

Figure 18:
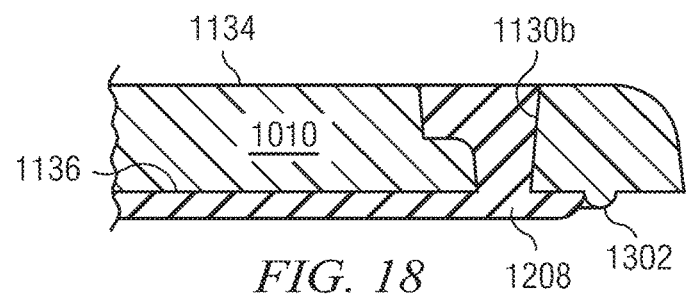
FIG. 18 is a sectional view corresponding to a section along line 18-18 of FIG. 17A.

As shown in FIGS. 17A and 17B, the through holes 1130a-b (representative through hole 1130b is shown here) on the lower surface 1136 on the bottom panel 1010 have a crescent shape. However, the through holes 1130a, b on the upper surface 1134 of the bottom panel 1010 have an oval shape. FIG. 17B shows the transition of the through hole 1130b from oval on the upper surface 1134 of the bottom panel 1010 to the crescent shape on the lower surface 1136 of the bottom panel 1010. FIG. 17A shows the through hole 1130 filled with the friction pad material 1208. FIG. 18 shows the through holes' transition from the crescent on the lower surface 1136 of the bottom panel 1010 to the oval on the upper surface 1134 of the bottom panel 1010. The changing shape and expanding area of the through hole 1130 as a function of distance from the lower surface allows for an additional mechanical lock of the friction pad 1208 to the bottom panel 1010. Through holes 120e-j are as described above for through hole 120 (FIGS. 8A, 8B and 9).

In the exemplary embodiment shown in FIGS. 10-18, the distance between the outermost edge of the first pier 1002 and outermost edge of the third pier 1006 is approximately 8 inches (20 cm). The height of the first, second and third piers 1002, 1004, 1006 is approximately 5 inches (13 cm). In FIG. 12, the friction pad 1208 extends approximately 0.060 inch (1.5 mm) from the lower surface 1136 of the bottom panel 1010.

In summary, a cargo organizer has been shown and described which can be used for many different sized packages and boxes and which has a friction pad to prevent cargo from moving while being transported in a vehicle. While illustrated embodiments of the present invention have been described and illustrated in the appended drawings, the present invention is not limited thereto but only by the scope and spirit of the appended claims.

We claim:

1. A cargo organizer for stabilizing cargo in a vehicle, the cargo organizer comprising:
an organizer body integrally molded from a first polymer compound, the organizer body having a bottom panel with an upper surface and a lower surface, the bottom panel disposed substantially at right angles to a vertical axis, a plurality of spaced-apart through-holes extending from the upper surface to the lower surface, each through-hole having a cross sectional area in a plane orthogonal to the vertical axis that expands as a function of the distance of the plane from the lower surface of the bottom panel, such that an area of the through-hole coplanar with the upper surface of the bottom panel is larger than an area of the through-hole coplanar with the lower surface of the bottom panel;

an upstanding first wall of the body integrally molded with the bottom panel, the first wall extending upwardly from the upper surface of the bottom panel and having an interior side and an opposed exterior side, the bottom panel laterally extending beyond both the interior and exterior sides of the first wall, at least one of the through-holes being positioned proximate the interior side and remote from the exterior side, at least one other of the through-holes being positioned proximate the exterior side and remote from the interior side; and a friction pad formed of a second polymer compound having a higher coefficient of friction than the first polymer compound, the friction pad overmolded on the lower surface of the bottom panel and extending through said through-holes on the bottom panel so as to provide a mechanical lock of the friction pad to the organizer body, the second polymer compound filling each of said through-holes such that a top surface of the second polymer compound is coplanar with the top surface of the bottom panel of the organizer body.

2. The cargo organizer of claim 1, wherein a hollow first pier of the organizer body extends upwardly from the upper surface of the bottom panel, the first pier forming at least part of the first wall, the through-holes being laterally spaced from the first pier.

3. The cargo organizer of claim 2, wherein a hollow second pier of the organizer body, spaced from the first pier, extends upwardly from the upper surface of the bottom panel, the through-holes being laterally spaced from the second pier.

4. The cargo organizer of claim 3, wherein the second pier forms a portion of the first wall.

5. The cargo organizer of claim 3, wherein a hollow third pier of the organizer body, spaced from the first and second piers, extends upwardly from the upper surface of the bottom panel, the through-holes being laterally spaced from the third pier.

6. The cargo organizer of claim 5, wherein the third pier forms a portion of the first wall.

7. The cargo organizer of claim 1, wherein the first pier has a vertical inner wall and an outer wall spaced from the inner wall, the inner wall of the first pier forming at least a portion of the first wall of the organizer body, the outer wall being sloped relative to the vertical axis.

8. The cargo organizer of claim 1, wherein the first wall is vertical.

9. A cargo organizer for stabilizing cargo in a vehicle, the cargo organizer comprising:

an organizer body integrally molded from a first polymer compound, the organizer body having a bottom panel with an upper surface and a lower surface, the lower surface of the bottom panel having a bottom panel surface area, the bottom panel disposed substantially at right angles to a vertical axis;

at least one hollow pier of the organizer body adjoining the upper surface of the bottom panel and upwardly extending from the bottom panel, the at least one hollow pier having an open bottom pier area coplanar with and adjacent to the bottom panel surface area; and a friction pad overmolded on the bottom panel to be coextensive with the bottom panel surface area, the friction pad formed from a second polymer compound having a higher coefficient of friction than the first polymer compound, the friction pad not extending to cover the open bottom pier area.

10. The cargo organizer of claim 9, wherein the at least one hollow pier is a first pier, the first pier being integrally molded with and partially defining a first wall, an upstanding second wall being integrally molded with the bottom panel and upwardly extending in parallel to the vertical axis and at an angle to the first wall, an upwardly extending, hollow second pier being integrally molded with and at least partially defining the second wall, an open bottom of the second pier being substantially coplanar with the bottom panel, the second pier being spaced from the first pier, the friction pad not extending to cover the open bottom of the second pier.

11. The cargo organizer of claim 10, wherein the first wall is joined to the second wall.

12. The cargo organizer of claim 10, wherein each of the first and second walls have an interior side and an exterior side opposed to the interior side, the bottom panel laterally extending beyond both the interior and exterior sides of the first and second walls, the first pier having at least one outer wall spaced from the first wall, the second pier having at least one outer wall spaced from the second wall, the first pier outer wall terminating at the open bottom area of the first pier, the second pier outer wall terminating at the open bottom area of the second pier.

13. The cargo organizer of claim 12, wherein the outer walls of the first and second piers are sloped relative to the vertical axis.

14. The cargo organizer of claim 10, further comprising an upwardly extending, hollow third pier integrally molded with and partially defining the first and second walls, an open bottom area of the third pier being substantially coplanar with the bottom panel, the third pier being spaced from the first and second piers, the friction pad not extending to cover the open bottom area of the third pier.

15. The cargo organizer of claim 14, wherein the third pier has at least one outer wall spaced from the first and second walls, the at least one outer wall of the third pier being sloped relative to the vertical axis.

16. The cargo organizer of claim 10, wherein the first pier has a first pier outer wall with a lower end, the second pier having a second pier outer wall having a lower end, the bottom panel having an outer margin, the outer margin being continuous with at least one of the first pier outer wall lower end and the second pier outer wall lower end.

17. The cargo organizer of claim 16, wherein the outer margin of the bottom panel is continuous with the lower ends of both of the first pier outer wall and second pier outer wall.

* * * * *